(12) United States Patent
Neet

(10) Patent No.: US 11,394,282 B2
(45) Date of Patent: Jul. 19, 2022

(54) METHOD OF FORMING A COMPONENT FOR AN ELECTRIC MACHINE

(71) Applicant: BorgWarner Inc., Auburn Hills, MI (US)

(72) Inventor: Kirk Neet, Noblesville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 411 days.

(21) Appl. No.: 16/536,992

(22) Filed: Aug. 9, 2019

(65) Prior Publication Data

US 2020/0052561 A1 Feb. 13, 2020

Related U.S. Application Data

(60) Provisional application No. 62/717,707, filed on Aug. 10, 2018.

(51) Int. Cl.
*H02K 15/00* (2006.01)
*H02K 15/04* (2006.01)
(Continued)

(52) U.S. Cl.
CPC ......... *H02K 15/0485* (2013.01); *B21D 53/26* (2013.01); *H02K 1/16* (2013.01);
(Continued)

(58) Field of Classification Search
CPC ...... H02K 5/225; H02K 5/1672; H02K 16/04; H02K 1/185; H02K 2203/12; H02K 47/20;
(Continued)

(56) References Cited

U.S. PATENT DOCUMENTS 6,901,649 B2 6/2005 Imori et al.
7,269,888 B2 9/2007 Neet
(Continued)

FOREIGN PATENT DOCUMENTS

CN 106787337 A 5/2017
EP 1988619 A1 11/2008
(Continued)

OTHER PUBLICATIONS

International Search Report and Written Opinion for International Applciation No. PCT/US2019/045949; International Filing Date Aug. 9, 2019; Report dated Nov. 28, 2019 (pp. 1-9).
(Continued)

*Primary Examiner* — Thiem D Phan
(74) *Attorney, Agent, or Firm* — Cantor Colburn LLP

(57) ABSTRACT

A method of forming a winding for an electric machine includes forming a plurality of conductors having a substantially identical wire form with a plurality of end turns joining a plurality of slot segments, defining a first portion of the plurality of conductors as first conductors, rotating a second portion of the plurality of conductors about a central axis to mirror the first conductors, defining the second portion of the plurality of conductors as second conductors, combining select ones of the first conductors and select ones of the second conductors to form conductor pairs, and combining a plurality of conductor pairs to form a multi-conductor winding.

16 Claims, 5 Drawing Sheets

(51) Int. Cl.
    *H02K 1/16* (2006.01)
    *H02K 3/12* (2006.01)
    *H02K 15/085* (2006.01)
    *B21D 53/26* (2006.01)
    *H02K 3/50* (2006.01)
(52) U.S. Cl.
    CPC ............ *H02K 3/12* (2013.01); *H02K 3/50* (2013.01); *H02K 15/0081* (2013.01); *H02K 15/085* (2013.01); *H02K 2203/06* (2013.01); *Y10T 29/53143* (2015.01)
(58) Field of Classification Search
    CPC ......... Y10T 29/53143; Y10T 29/49009; Y10T 29/49208; H01R 2201/10
    USPC .......... 29/732, 596, 598, 606, 729, 787, 795
    See application file for complete search history.

(56) References Cited

U.S. PATENT DOCUMENTS

| | | | |
|---|---|---|---|
| 7,703,192 B2 | 4/2010 | Sadiku et al. | |
| 7,952,245 B2 | 5/2011 | Ueda et al. | |
| 8,832,928 B2* | 9/2014 | Akimoto | H02K 15/0478 29/605 |
| 10,404,120 B2* | 9/2019 | Ishizuka | H02K 3/14 |
| 2006/0163959 A1 | 7/2006 | Ogawa et al. | |
| 2009/0320275 A1 | 12/2009 | Dobashi et al. | |
| 2010/0231082 A1 | 9/2010 | Bodin et al. | |
| 2014/0042865 A1 | 2/2014 | Mourou et al. | |
| 2014/0252908 A1 | 9/2014 | Sadiku et al. | |
| 2014/0354095 A1 | 12/2014 | Ishikawa et al. | |
| 2015/0054374 A1 | 2/2015 | Neet | |
| 2017/0229936 A1 | 8/2017 | Kang et al. | |
| 2020/0028417 A1 | 1/2020 | Neet et al. | |
| 2020/0052537 A1 | 2/2020 | Yoon | |
| 2020/0052562 A1 | 2/2020 | Neet | |

FOREIGN PATENT DOCUMENTS

| | | |
|---|---|---|
| JP | H1198786 A | 4/1999 |
| JP | 2004023808 A | 1/2004 |
| JP | 2009148147 A | 7/2009 |

OTHER PUBLICATIONS

International Search Report and Written Opinion for International Application No. PCT/US2019/045947; International Filing Date Aug. 9, 2019; Report dated Nov. 28, 2019 (pp. 1-8).

International Search Report and Written Opinion for International Application No. PCT/US2019/045967; International Filing Date Aug. 9, 2019; Report dated Dec. 5, 2019 (pp. 1-8).

International Search Report and Written Opinion for International Application No. PCT/US2019/016243 International Filing Date Feb. 1, 2019; Report dated May 17, 2019 (pp. 1-8).

* cited by examiner

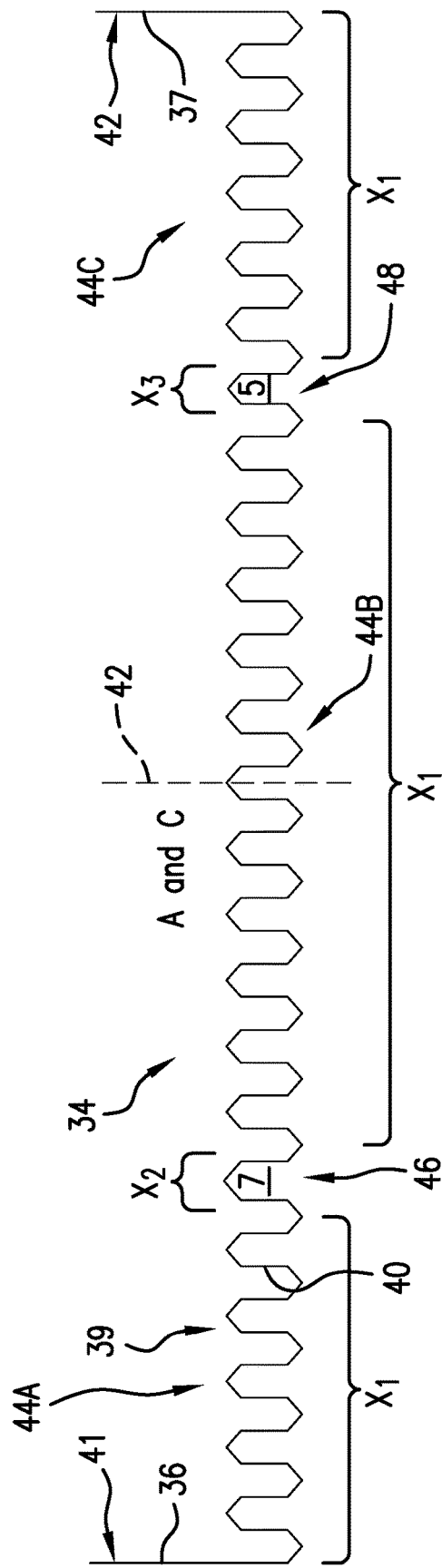
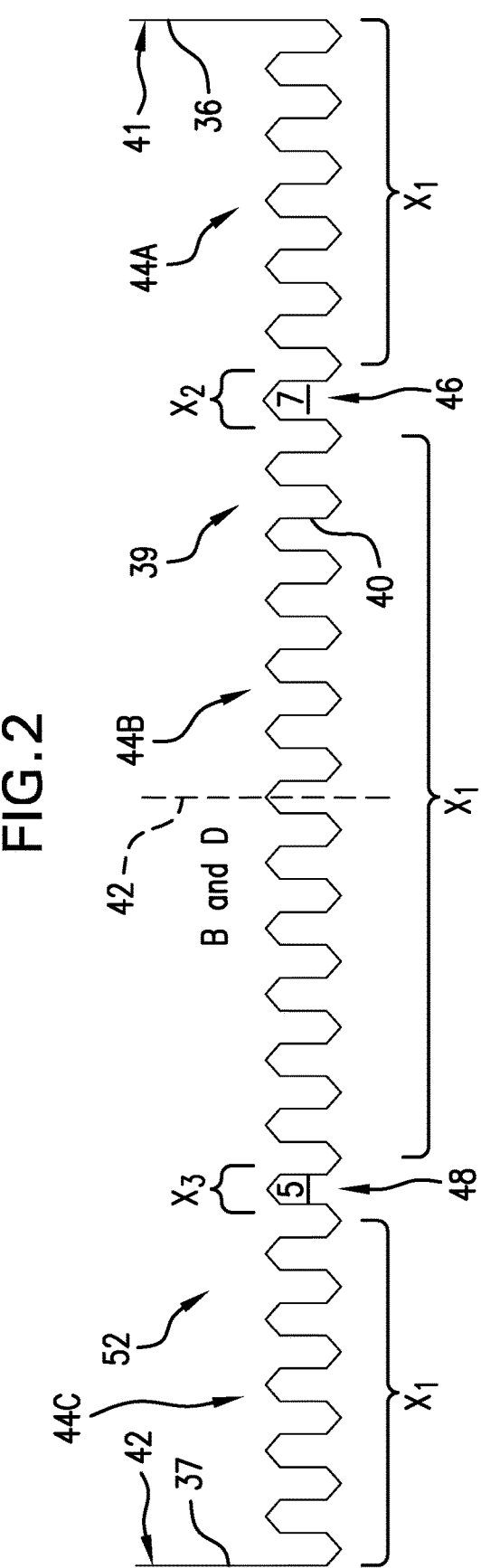
FIG.2
FIG.3

Wires A and B

Wires C and D

METHOD OF FORMING A COMPONENT FOR AN ELECTRIC MACHINE

CROSS-REFERENCE TO RELATED APPLICATIONS

This application claims the benefit of an earlier filing date from U.S. Provisional Application No. 62/717,707 filed Aug. 10, 2018, the entire disclosure of which is incorporated herein by reference.

BACKGROUND

The stator of an electrical motor or generator includes two parts and insulation material. The first part is the lamination. A lamination is typically formed of laminated sheets of electrical steel that is formed (stamped, rolled or bent) into an annulus shape having an ID, an OD and a stack height. The lamination further includes slots open to the ID or OD. The slots have a width and a depth. In between each slot is a lamination tooth that extends from the ID or OD lamination back iron (yoke).

The second part is the winding. The winding is typically formed of insulated copper wire. It should be understood however, other conductive materials, such as aluminum, might be used. The winding includes a number of phases—typically 3, 5 or 6. The number of phases may vary. For each phase, the winding includes conductors having slot segments and end turns. The slot segments are housed in the lamination slots. The end turns span mostly circumferentially and connect two slot segments together. The winding may be a delta winding or a wye winding.

A distributed winding is a winding that has poles of one phase that include more than one slot, typically adjacent slots. Each phase may also occupy multiple winding layers. For example, in a 3 phase winding, there may be 24 poles, with two slots being occupied by each pole and the winding may occupy 8 winding layers. Each pole may span three slots, but only occupy two slots at a time in any given winding layer. The winding should be electrically balanced in order to minimize losses and increase efficiency. Creating an electrically balanced winding that may be introduced into more compact stators is a challenge. Further, forming conductors into winding shapes that may be inserted into the lamination to form a balanced winding is a time consuming and challenging endeavor. Accordingly, the industry would be receptive of a system that forms a balanced stator winding that has a reduced thickness and which may include windings that are easily formed, combined, and introduced into a lamination.

SUMMARY

Disclosed is a method of forming a winding for an electric machine including forming a plurality of conductors having a substantially identical wire form with a plurality of end turns joining a plurality of slot segments, defining a first portion of the plurality of conductors as first conductors, rotating a second portion of the plurality of conductors about a central axis to mirror the first conductors, defining the second portion of the plurality of conductors as second conductors, combining select ones of the first conductors and select ones of the second conductors to form conductor pairs, and combining a plurality of conductor pairs to form a multi-conductor winding.

BRIEF DESCRIPTION OF THE DRAWINGS

FIG. 2 depicts a first conductor of the winding of the stator of FIG. 1, in accordance with an aspect of an exemplary embodiment;

FIG. 3 depicts a second conductor of the winding of the stator of FIG. 1, in accordance with an aspect of an exemplary embodiment;

DETAILED DESCRIPTION

Figure 1:
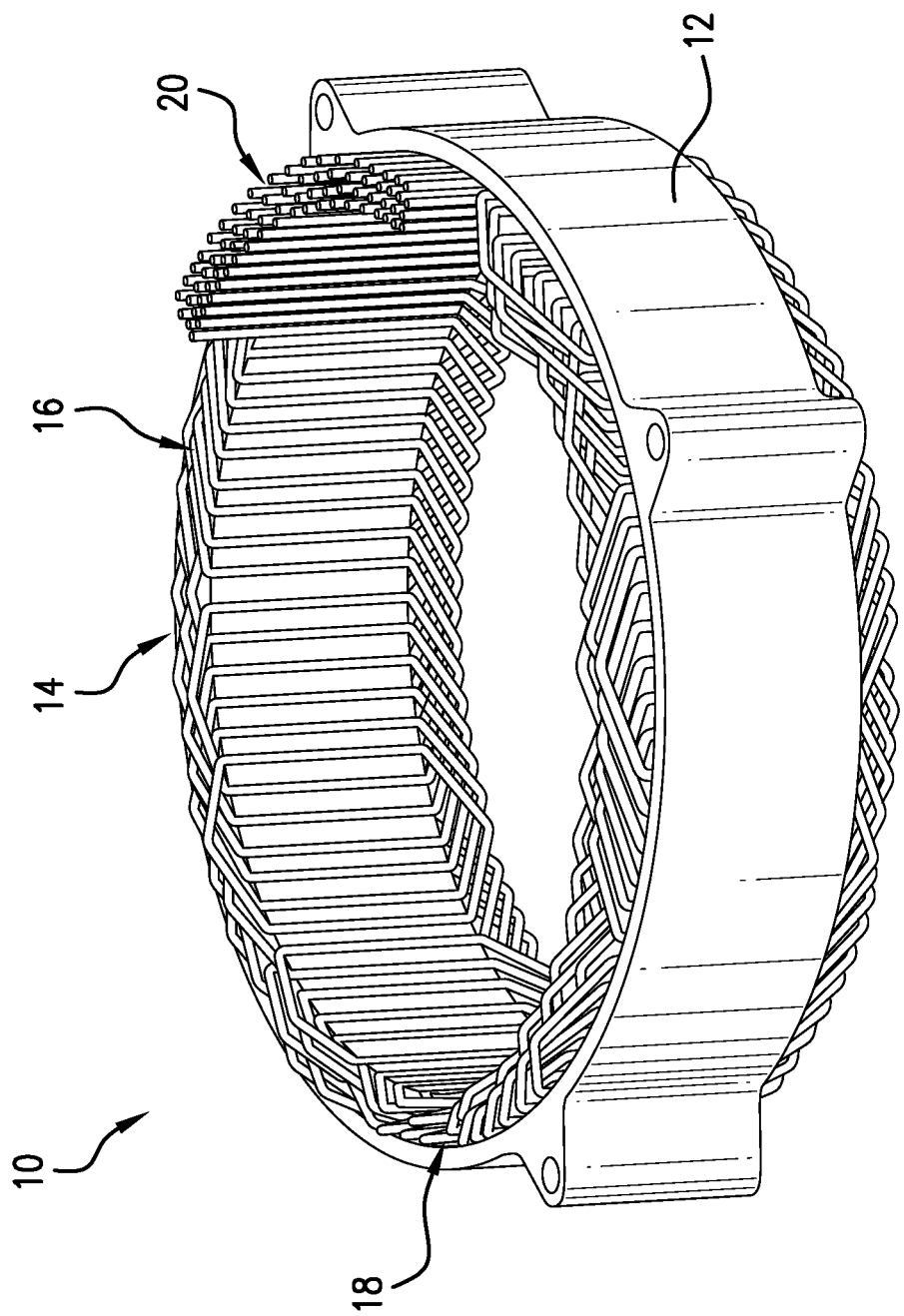
FIG. 1 depicts a stator for an electric motor including a winding, formed in accordance with an aspect of an exemplary embodiment.

A stator for an electric machine is indicated generally at 10 in FIG. 1. Stator 10 includes a stator body 12 that supports a windings 14 formed from a plurality of conductors 16. Stator body 12 may be formed from an electrically conductive material and includes a plurality of slots (not shown) which, in the embodiment shown, are formed in an inner annular surface (also not shown). Windings 14 include a woven section 18 and a connector lead section 20. Woven section 18 defines a portion of winding 14 at which point conductors may be interlaced to establish a desired form factor and electrical balance. Connector lead section 20 defines a portion at terminal ends of the conductors forming winding 14 may be interconnected and coupled to, for example, a power source.

Winding 14 is formed by creating woven conductor pairs of AB conductors and C/D conductors. As will become apparent herein, a B conductor may represent a mirror image of an A conductor and a D conductor may represent a mirror image of a C conductor, with the A and C conductors being substantially identical and the B and D conductors being substantially identical. Further, as will become readily apparent herein, each of the conductors A, B, C, and D includes an identical form and may only differ by an orientation relative to, for example, a selected axis.

In an exemplary embodiment, plurality of conductors 16 each have a substantially identical wire form or geometry. A portion of plurality of conductors 16 is selected as first conductors, one of which is shown at 34 in FIG. 2. First conductor 34 includes a first end 36, a second end 37, a plurality of end turns 39 joining a plurality of slot segments, one of which is shown at 40, extending therebetween. The plurality of end turns 39 may have a triangular or gabled shape, such as shown in FIG. 2. First conductor 34 may represent either an A conductor or a C conductor depending upon position as will be detailed herein. First conductor 34 may include a central axis 42. The central axis 42 is substantially parallel to the plurality of slot segments. As can be seen in FIG. 2 or FIG. 3, there plurality of conductors 16 are formed with at least 12 end turns 39 disposed on the right of the central axis and at least 12 end turns 39 disposed on the left of the central axis. First end 36 of first conductor 34 defines a first connector lead 41 and second end 37 defines a second connector lead 43. The central axis 42 is located equal distance from first connector lead 41 and second connector lead 43. Plurality of end turns 39 include a first plurality of bends 44A having a first winding pitch X1, a second plurality of bends 44B having the first winding pitchy X1, and a third plurality of bends 44C having the first winding pitch X1. Plurality of end turns 39 also include a bend 46 having a second winding pitch X2 and a bend 48 having a third winding pitch X3. The bend 46 is located on one side of the central axis 42 and the bend 48 is located on the opposite side of central axis 42. The central axis 42 is located equal distance from the bend 46 and the bend 48.

In accordance with an exemplary aspect, second winding pitch X2 may be one greater than first winding pitch X1 and third winding pitch X3 may be one less than first winding pitch X1. In an embodiment, first winding pitch X1 may represent a 6 pitch, second winding pitch X2 may represent a 7 pitch, and third winding pitch X3 may represent a 5 pitch. The particular pitch value may vary. The phrase 6 pitch describes that a particular end turn connects two slot segments that span over 5 slots.

Figure 4:
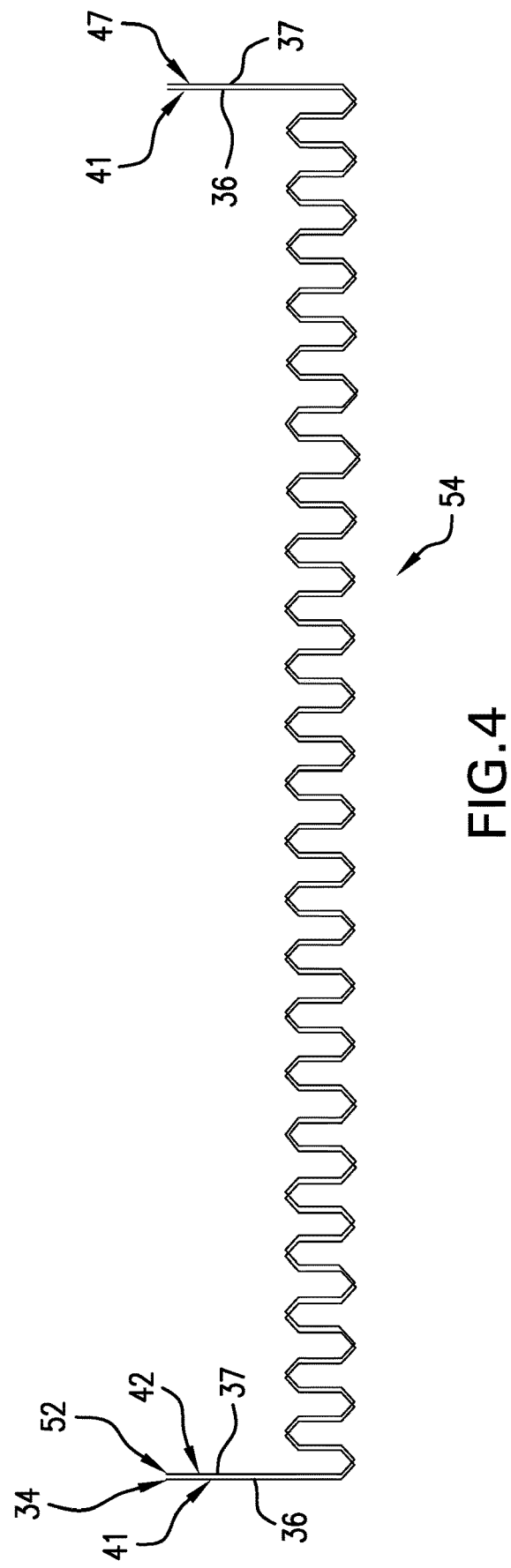
FIG. 4 depicts a conductor pair including a first conductor and a second conductor, in accordance with an aspect of an exemplary embodiment.
Figure 5:
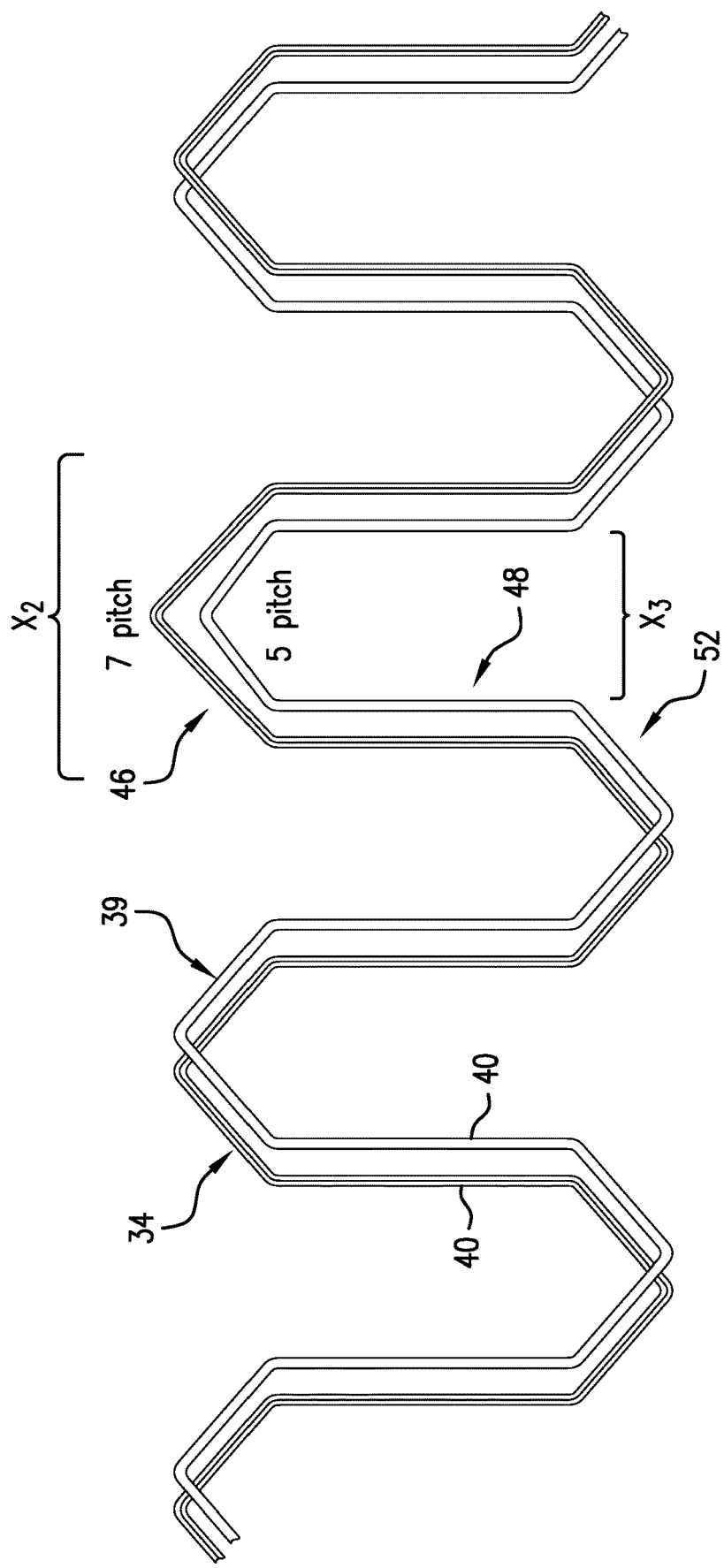
FIG. 5 depicts a portion of the conductor pair of FIG. 4, in accordance with an exemplary aspect.

In further accordance with an exemplary embodiment, another portion of plurality of conductors 16 are selected as second conductors 52 as shown in FIG. 3. Second conductor 52 is a mirror image of first conductor 34. That is, first conductor 34 may be rotated 180° about central axis 42 to form second conductor 52. After the first conductor 34 is rotated 180 degrees, the first connector lead 41 swaps positions with the second connector lead 43 and the bend 46 swaps position with bend 48. Second conductor 52 may define wither a B conductor or a D conductor as will be discussed herein. As will be detailed herein, a first conductor 34 is combined with a second conductor 52 to form a conductor pair 54 as shown in FIG. 4. When introduced into stator body 12, first conductor 34 and second conductor 52 will reside in adjacent slots. First conductor 34 and second conductor 52 may be combined such that bend 48 having the third winding pitch X3 of second conductor 52 nests within bend 46 having the second pitch of first conductor 34 as shown in FIG. 5. The nesting allows for conductor pair 54 to possess a reduce thickness as will be detailed herein.

Figure 6:
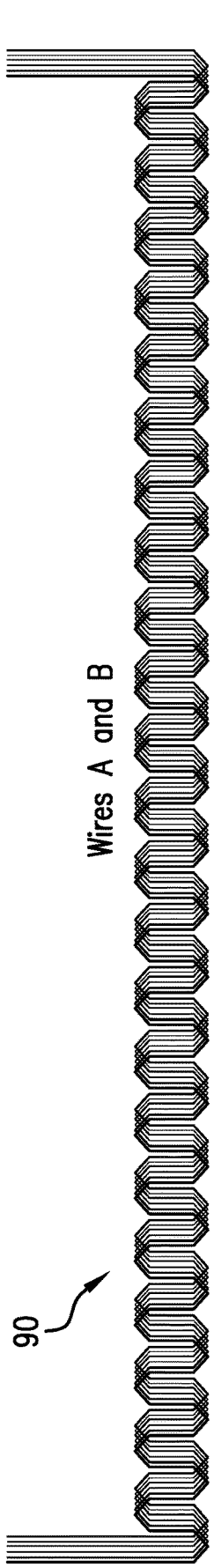
FIG. 6 depicts a first multi-conductor winding of the stator of FIG. 1, in accordance with an aspect of an exemplary embodiment.
Figure 7:
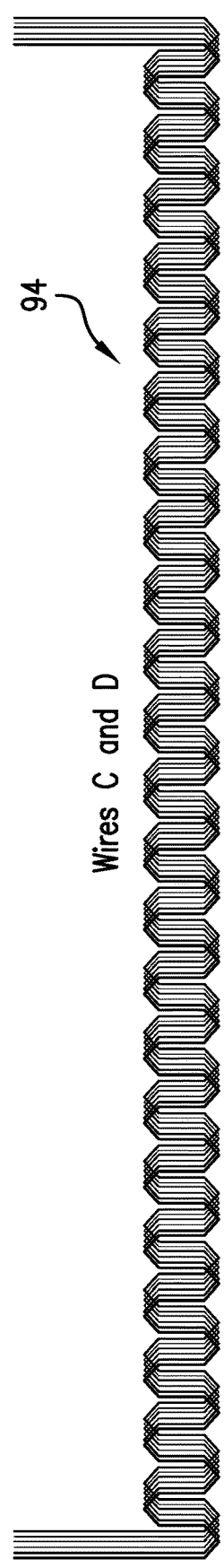
FIG. 7 depicts a second multi-conductor winding of the stator of FIG. 1, in accordance with an aspect of an exemplary embodiment.

In an embodiment, multiple conductor pairs 54 are combined to form a first multi-conductor winding 90 as shown in FIG. 6. At this point, it should be understood that first multi-conductor winding 90 is formed by overlaying three conductor pairs 54 of AB conductors. Thus, first multi-conductor winding 90 may take the form of a six conductor winding in an exemplary embodiment. At this point, a second multi-conductor winding 94 is formed in a manner similar to that of first multi-conductor winding 90. Second multi-conductor winding 94 is formed by overlaying three conductor pairs (not separately labeled) of C/D conductors as shown in FIG. 7.

Figure 8:
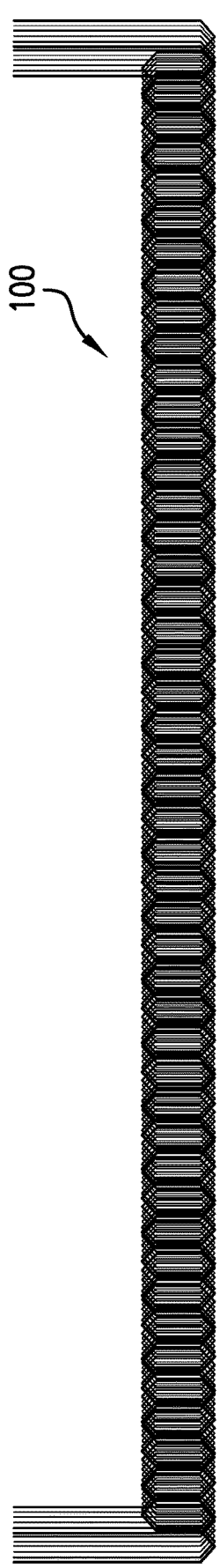
FIG. 8 depicts a second multi-conductor winding overlaid onto the first multi-conductor winding to form the winding of the stator of FIG. 1, in accordance with an aspect of an exemplary embodiment.

Second multi-conductor winding 94 may be overlaid onto first multi-conductor winding 90 to form a Phase winding 100 of stator 10 as shown in FIG. 8. Phase winding 100 includes twelve conductors, in accordance with an exemplary embodiment. When introduced into stator body 12, second multi-conductor winding 94 may be located one (1) pole from first multi-conductor winding 90. In an embodiment, second multi-conductor winding 94 may be interleaved with first multi-conductor winding 90 in order to improve the electrical balancing of phase winding 100.

Additional phase windings (not shown) may be formed in a similar manner and introduced into stator body 12 to form plurality of windings 14.

In an exemplary embodiment, plurality of windings 14 has only one shape and two orientations of wires A, C and B, D. It is understood that other combinations of wires exist. For a stator having 3 slots per pole per phase and 3 phases, the common pitch is 9 and the special pitch areas are 11 pitch over two eight pitches. In such a design, there may be three distinct wire shapes and the one is the mirror image of one of the other shapes. The process of forming a stator having 3 slots per pole per phase and 3 phases is similar to the process described above but two wire formers are required and only every third wire is rotated 180 degrees left to right.

At this point, it should be understood that the exemplary embodiments describe a system for forming a stator having a winding formed from multiple conductors each having an identical geometry. That is, each winding conductor is formed, manipulated, and combined with other winding conductors to form a plurality of windings for an electric machine. While described as being formed from first and second windings, it should be understood that the phase winding could include three or more windings. After insertion the windings could be connected in a Delta configuration or a wye configuration.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of forming a winding for an electric machine comprising:

forming a plurality of conductors having a substantially identical wire form with a plurality of end turns joining a plurality of slot segments;

defining a first portion of the plurality of conductors as first conductors;

rotating a second portion of the plurality of conductors about a central axis to mirror the first conductors;

defining the second portion of the plurality of conductors as second conductors;

combining select ones of the first conductors and select ones of the second conductors to form conductor pairs; and combining a plurality of conductor pairs to form a multi-conductor winding.

2. The method of claim 1, wherein combining select ones of the first conductors and select ones of the second conductors includes nesting one of the end turns of one of the second conductors within one of the end turns of one of the first conductors.

3. The method of claim 2, wherein combining select ones of the first conductors and select ones of the second conductors includes nesting an end turn of one of the first conductors between slot segments of one of the second conductors.

4. The method of claim 1, wherein combining the plurality of conductor pairs includes combining a first conductor pair, a second conductor pair, and a third conductor pair to form a six-conductor winding.

5. The method of claim 1, further comprising: combining a first multi-conductor winding and a second multi-conductor winding to form at least a portion of a stator winding for the electric machine.

6. The method of claim 1, wherein forming the plurality of conductors includes forming a plurality of conductors having a plurality of end turns having at least three distinct winding pitches.

7. The method of claim 6, wherein forming the a plurality of conductors having the plurality of end turns having at least three distinct winding pitches includes forming a first portion of the plurality of end turns to include a first winding pitch, at least one of the plurality of end turns to include a second winding pitch that is distinct from the first winding pitch, and at least one other of the plurality of end turns to include a third winding pitch that is distinct from the first and second winding pitches.

8. The method of claim 7, wherein forming the at least one of the plurality of end turns to include the second winding pitch includes forming the at least one of the plurality of end turns to include a winding pitch that is one greater than the first winding pitch.

9. The method of claim 8, wherein forming the at least one other of the plurality of end turns to include the third winding pitch includes forming the at least one other of the plurality of end turns to include a winding pitch that is one less than the first winding pitch.

10. The method of claim 8, wherein forming the plurality of conductors includes forming the end turns having a triangular shape.

11. The method of claim 10, wherein forming one of the second conductors further includes forming a second conductor having at least 12 end turns disposed on one side of the central axis and at least 12 end turns disposed on an opposite side of the central axis.

12. The method of claim 7, wherein forming one of the second conductors further includes locating the central axis of the one of the second conductors an equal distance from the end turn having the second winding pitch and the end turn having the third winding pitch.

13. The method of claim 12, wherein forming one of the second conductors with a first connector lead and a second connector lead and locating the central axis of the one of the second conductors an equal distance from the first connector lead and the second connector lead.

14. The method of claim 1, wherein the central axis of the second conductors are located substantially parallel to slot segments of the second conductors.

15. The method of claim 1, further comprising: positioning the multi-conductor winding in a stator body of an electric machine.

16. An electric machine comprising:
a stator including a stator body and a plurality of windings formed from the method of claim 1.

* * * * *